(12) United States Patent
Volkova (10) Patent No.: US 11,074,500 B2
(45) Date of Patent: Jul. 27, 2021

(54) PREDICTION OF SOCIAL MEDIA POSTINGS AS TRUSTED NEWS OR AS TYPES OF SUSPICIOUS NEWS

(71) Applicant: BATTELLE MEMORIAL INSTITUTE, Richland, WA (US)

(72) Inventor: Svitlana Volkova, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 849 days.

(21) Appl. No.: 15/886,079

(22) Filed: Feb. 1, 2018

(65) Prior Publication Data

US 2018/0365562 A1    Dec. 20, 2018

Related U.S. Application Data

(60) Provisional application No. 62/522,353, filed on Jun. 20, 2017.

(51) Int. Cl.
| | | |
|---|---|---|
| *G06N 7/00* | (2006.01) | |
| *G06N 3/08* | (2006.01) | |
| *G06Q 50/00* | (2012.01) | |
| *G06N 3/04* | (2006.01) | |
| *G06F 40/30* | (2020.01) | |
| *G06F 40/211* | (2020.01) | |

(52) U.S. Cl.
CPC ............ *G06N 3/08* (2013.01); *G06F 40/211* (2020.01); *G06F 40/30* (2020.01); *G06N 3/0445* (2013.01); *G06N 3/0454* (2013.01); *G06N 7/005* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 9,519,858 B2 | 12/2016 | Zweig et al. | |
| 2017/0169475 A1 | 6/2017 | Korpusik et al. | |
| 2017/0286867 A1* | 10/2017 | Bell | ................... G06N 3/0445 |
| 2018/0018581 A1* | 1/2018 | Cook | ..................... H04L 67/20 |

OTHER PUBLICATIONS

Rubin et al. Fake News or Truth? Using Satirical Cues to Detect Potentially Misleading News, Jun. 2016, Proceedings of NAACL-HLT, pp. 7-17 (Year: 2016).*
Starbird, K., et al., Could This Be Ture? I think So! Expressed Uncertainty in Online Rumoring, HCDE, Information School, Department of Sociology, University of Washington, Seattle, WA, ACM 978-1-4503-3362-7/7/16/05, 2016.

(Continued)

*Primary Examiner* — David R Vincent
(74) *Attorney, Agent, or Firm* — Derek H. Maughan (57) ABSTRACT

Disclosed are systems, techniques, and non-transitory storage media for predicting social media postings as being trusted news or a type of suspicious news. The systems, techniques, and non-transitory storage media are based on unique neural network architectures that learn from a combined representation including at least representations of social media posting content and a vector representation of communications among connected users.

8 Claims, 5 Drawing Sheets

(56) References Cited

OTHER PUBLICATIONS

Volkova, S., Predicting the Future with Deep Learning and Signals from Social Media, Data Sciences and Analytics Group, National Security Directorate, Pacific Northwest National Laboratory, Mar. 27-28, 2017.

Wang, W. Y., "Liar, Liar Pants on Fire": A New Benchmark Dataset for Fake News Detection, Department of Computer Science, University of California, Santa Barbara, Santa Barbara, CA.

Fact Checks, https//developers.google.com/search/docs/data-types/factcheck.

* cited by examiner

PREDICTION OF SOCIAL MEDIA POSTINGS AS TRUSTED NEWS OR AS TYPES OF SUSPICIOUS NEWS

CROSS-REFERENCE TO RELATED APPLICATIONS

This invention claims priority from U.S. provisional patent application No. 62/522,353 entitled, "Classification of Social Media Postings as Trusted News or as Types of Suspicious News," filed Jun. 20, 2017.

ACKNOWLEDGEMENT OF GOVERNMENT SUPPORT

This invention was made with Government support under Contract DE-AC0576RL01830 awarded by the U.S. Department of Energy. The Government has certain rights in the invention.

FIELD

The present disclosure relates generally to improved deception detection technology and more particularly to neural networks for predicting social media posts as trusted news or as types of suspicious news.

BACKGROUND

Recently, there has been an increased number of disturbing incidents of fabricated stories proliferated through social media having a serious impact on real-world events. False news stories distributed in social media often vary depending on the intent behind falsification. Unlike trusted (e.g., verified) news, suspicious news tends to build narratives rather than report facts. One example of suspicious news is disinformation, which communicates false facts to deliberately deceive readers or promote a biased agenda. Other types of suspicious news content can include misinformation posts generated and propagated from propaganda and so-called clickbait ("eye-catching" headlines) accounts. The intent behind propaganda and clickbait varies from opinion manipulation and attention redirection to monetization and traffic attraction. Hoaxes are another example of a type of misinformation that aims to deceive the reader. Yet another example is satire, where the writer's primary purpose is not to mislead the reader, but rather entertain or criticize. However, satirical news and hoaxes may also be harmful, especially when they are shared out of context. According to a World Economic Forum report "massive digital disinformation" was listed as one of the main risks of modern society. Indeed, there has been an increasing number of deeply disturbing incidents of fabrications and disinformation being proliferated through social media and having serious consequences in the real world.

SUMMARY

Disclosed are systems, computer-implemented methods, and computer-readable non-transitory storage media for predicting social media postings as being trusted news or a type of suspicious news. Performance of the embodiments described herein is accurate and predictions having a mean squared error less than 0.06 is achievable when predicting a clickbaitness score between 0 and 1 (more or less clickbait-like). In some embodiments, a mean square error of 0.04 and an $R^2$ of 0.44 is achievable. In other embodiments involving classification rather than regression, a F1 score (between 0 and 1; the higher the better) of 0.95 when predicting social media postings as being trusted or suspicious news in English, and F1 score of 0.92 for predicting social media postings a type of suspicious news are achievable.

In some embodiments, a computer-implemented method of predicting social media posts as trusted news or as types of suspicious news comprises the steps of providing records from a social media site, each record comprising a social-media posting; for each record, calculating a text representation based on the record, linguistic markers based on the record, and a user representation representing communications among connected users regarding the record; inputting the text representations, linguistic markers, and user representations into a neural network having a content sub-network receiving the text representations and a vector representation sub-network receiving the linguistic markers and the user representations; merging output from the content sub-network and output from the vector representation network according to a fusion operator, wherein the output from each sub-network has a different modality; and calculating according to the neural network a distribution over probability classes regarding the records. In certain embodiments, the content sub-network comprises an embedding layer and at least one of a convolutional layer or a recurrent layer. Examples of the recurrent layer can include a long-short term memory layer. In certain embodiments, the linguistic markers comprise psycholinguistic cues, style, syntax, biased language markers, subjective language markers and connotations, hedges, implicative, factive, assertive and report verbs, moral foundation theory markers, or combinations thereof. In certain embodiments, the records comprise one or more foreign languages. According to some embodiments, for records having a single language, word-level text representations can be applied to encode records. For records having a plurality of languages, text representations can occur on a character or byte level, rather than at a word level. In certain embodiments, the computer-implemented method can further comprise the step of labeling the probability classes with labels correlated to a set of pre-selected labels based on trusted news or types of suspicious news. One non-limited example of a set of pre-selected labels can include disinformation, propaganda, hoax, clickbait and satire. In certain embodiments, the method can further comprise inputting an image, an image representation, or both into the neural network. In certain embodiments, the vector representation sub-network of the neural network receives the image, the image representation, or both.

In some embodiments, a system to predict social media posts as trusted news or as types of suspicious news according to a neural network comprises at least one processing device and at least one computer-readable medium storing instructions, which when executed by the at least one processing device, cause the at least one processing device to calculate a distribution over probability classes for the social media postings using a neural network trained on a training set. The neural network learns from a combined representation comprising a text representation, a linguistic marker, and a user representation. The text representation can comprise a text sequence representing content of the social media posting. The linguistic marker can comprise a first vector representation of linguistic cues associated with the social media posting. The user representation can comprise a second vector representation of communications among connected users. In certain embodiments, the instructions, when executed by the at least one processing device further cause the at least one processing device to label the probability classes with labels correlated to a set of preselected labels based on types of suspicious news. In certain embodiments, the neural network comprises a content sub-network to which the text representations are inputs and a vector representation sub-network to which the first vector representations, the second vector representations, or both are inputs. In certain embodiments, the content sub-network comprises an embedding layer and at least one of a convolutional layer or a recurrent layer. In certain embodiments, the recurrent layer comprises a long-short term memory layer. The embedding layer can comprise less than 300 units. In one embodiment, the embedding layer comprises 200 units. The CNN layer can comprise less than 200 units in each layer. In one embodiment, the CNN layer comprises 50 to 150 units per layer. In another, it comprises 100 units per layer. In certain embodiments, the CNN comprises less than 5 layers. In one embodiment, the CNN comprises two layers. In another, the CNN comprises one layer. In certain embodiments, the vector representation sub-network comprises at least two dense layers. In another embodiment, the vector representation sub-network comprises 1-5 layers. The number of units within each layer can scale according to the amount of data provided to the sub-network. In certain embodiments, each layer comprises less than 200 units. In another embodiment, each layer comprises between 50 and 150 layers. In one embodiment, each layer comprises 100 units. In certain embodiments, the neural network further comprises a fusion operator configured to merge output from a content sub-network and output from a vector representation sub-network, the output from each sub-network having a different modality. The fusion operator can comprise a tensor concatenation layer, a dense layer, and a probability activation layer. In one embodiment, the dense layer comprises less than 200 units. In another embodiment, the dense layer comprises between 50 and 150 units. In yet another embodiment, the dense layer comprises 100 units. In certain embodiments, the social media postings comprise one or more foreign languages. In certain embodiments, the combined representation further comprises images, image representations, or both.

In some embodiments, a non-transitory, computer-readable storage medium stores one or more programs. The one or more programs comprise instructions, which when executed by one or more processors of an electronic device, cause the device to calculate a predictive score characterizing social media posts as trusted news or as a type of suspicious news. The neural network can comprise a content sub-network receiving inputs comprising of a vector of text representations of social media posts; a vector representation sub-network receiving vector inputs comprising user representations representing communications among connected users regarding the social media posts and comprising linguistic markers of the social media posts; and a fusion operator merging output from the content sub-network and output from the vector representation sub-network, wherein the output from each sub-network has a different modality. In certain embodiments, the text representations comprise text sequences converted to vector representations. In certain embodiments, the vector inputs further comprise images, image representations, or image features.

The purpose of the foregoing summary and the latter abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. Neither the summary nor the abstract is intended to define the invention of the application, which is measured by the claims, nor is it intended to be limiting as to the scope of the claims in any way.

DETAILED DESCRIPTION

Automatic prediction of fake news from social media postings is in itself an innovative task. Prior attempts at the distantly related task of deception detection have relied ineffectively on certain hand-engineered features, or combinations of features, that can include shallow linguistic features, network features (e.g., user metadata including number of neighbors and neighborhood density in a network), user behavior, and verification by external sources, and have focused on spoken and written narratives, voice logs, and online product/service reviews for problems caused by bots, trolls, and/or SPAM sources. The inventors have determined that prediction of social media posts by social media users as being trusted news or as types of suspicious news can be achieved accurately and automatically using neural network architectures described herein. Furthermore, the inventors unexpectedly determined that the addition of syntax and grammar features do not consistently improve prediction performance, but rather that the problem of inaccuracy when making predictions regarding social media postings is solved by providing social interaction among users related to each posting (i.e., user representations) as one of a plurality of representations to neural networks, and particularly to neural networks having architectures encompassed by embodiments described herein. In addition to user representations, other helpful representations can include linguistic markers extracted from social media postings and social media posting content. Further still, other helpful representations can include one or more of images and image representations. According to embodiments described herein, incorporating these representations in a late fusion technique increases performance and accuracy.

Figure 1:
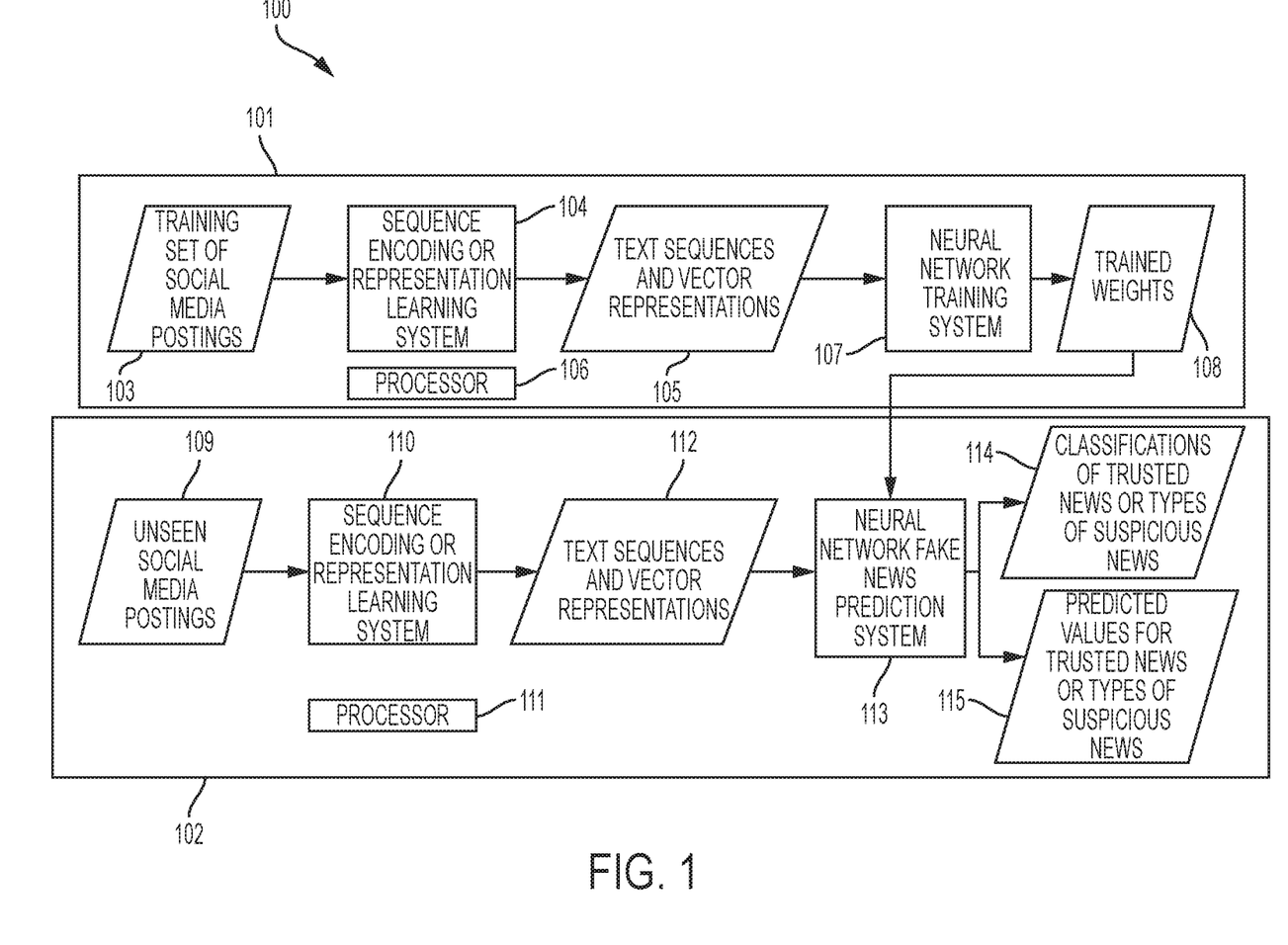
FIG. 1 is a block diagram representing one embodiment of a system and process for predicting social media postings as trusted news or as types of suspicious news.

FIG. 1 is a block diagram of one embodiment of a system 100 for predicting social media postings as being trusted news or types of suspicious news. The embodiment illustratively includes training system 101 and runtime suspicious news prediction system 102. Each system illustratively includes representation extraction systems 104 and 110 and a processor 106 and 111. The processors are not limited to central processing units (CPUs), but also encompass graphics processing units (GPUs). The representation extraction systems 104 and 110 receive sets of social media postings for training or prediction purposes, respectively, to generate text sequences from content of social media postings and vector representations from particular indicators, or signals, of the social media postings 105 and 112. Examples of indicators can include, but are not limited to, image representations, linguistic cues, psycholinguistic cues, bias cues, subjectivity cues, moral foundations, and connotations. During training, the neural network training system 107 learns weights which can be corrected according to known outcomes of the training set to yield trained weights 108. The training can be an iterative process. The trained weights are provided for the neural network suspicious news prediction system 115. During runtime, text (or word or character or byte) sequences and other vector representations 112 based on unseen social media postings are provided to the neural network fake news prediction system, which determines predictions regarding the social media postings. The predictions can include classifications of trusted news or types of suspicious news 114. Alternatively, or in addition to the classifications, the predictions can include predictive scores associated with each social media posting as being trusted news and/or types of suspicious news 115.

Figure 2:
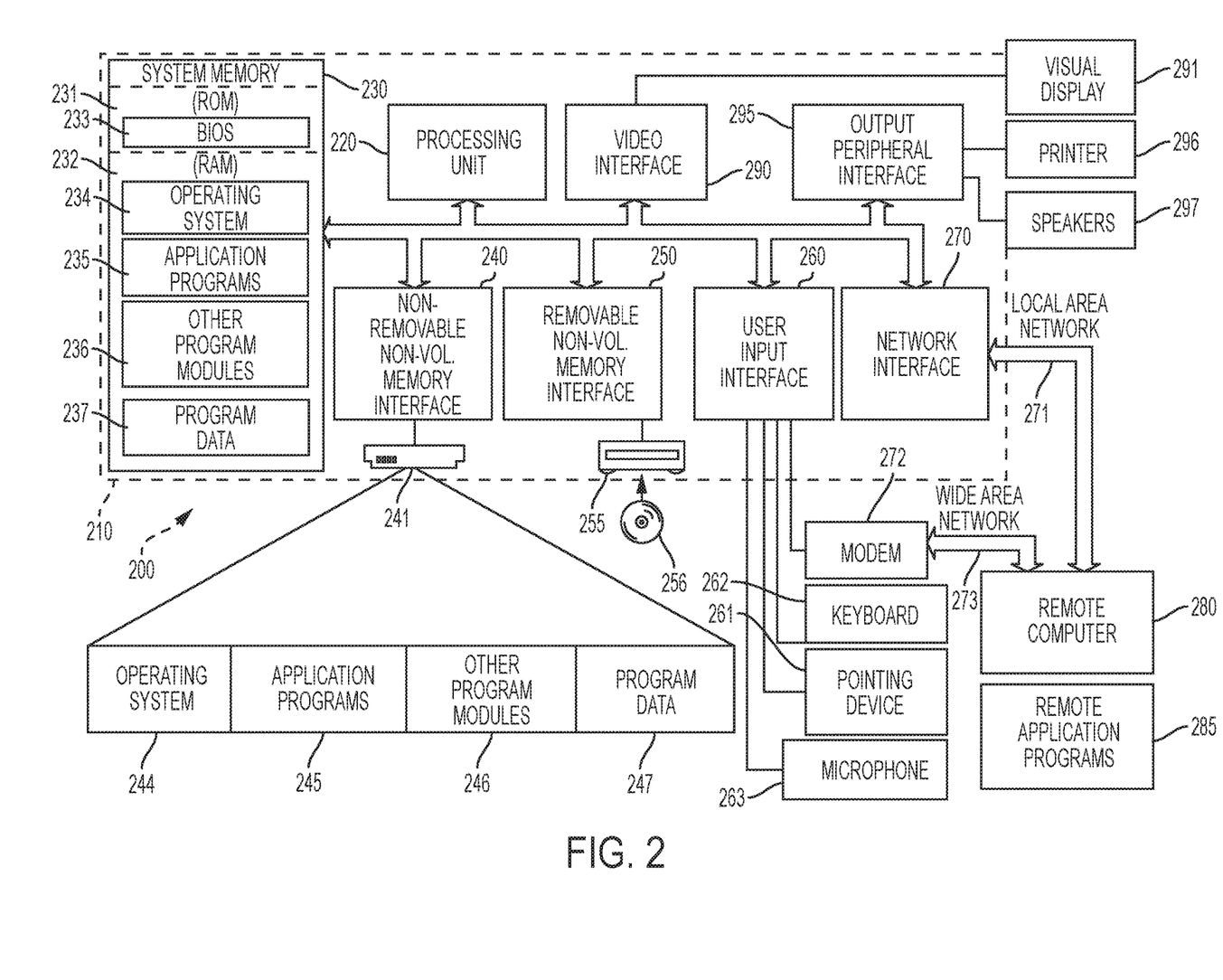
FIG. 2 is a schematic diagram representing a computer system suitable for predicting social media postings as trusted news or as types of suspicious news according to embodiments described herein.

FIG. 2 is one embodiment of a computing environment in which a system such as that represented by 100, or parts of it, can be deployed. With reference to FIG. 2, an example system for implementing some embodiments includes a general-purpose computing device in the form of a computer 210. Components of computer 210 may include, but are not limited to, a processing unit 220 (which is not limited to CPUs, but can comprise GPUs such as 106 or 111), a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to embodiments and illustrations contained elsewhere herein can be deployed in corresponding portions of FIG. 2.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, sash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210.

Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random-access memory (RAM) 232. A basic input/output system 233 (BIOS), containing the basic routines that help to transfer information between elements within computer 210, such as during startup, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable volatile/nonvolatile computer storage media. By way of example only, FIG. 2 illustrates a hard disk drive 241 that reads from or writes to non-removable, nonvolatile magnetic media, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, sash memory cards, digital versatile disks, digital video tape, solid state RAM, solid state ROM, and the like. The hard disk drive 241 is typically connected to the system bus 221 through a non-removable memory interface such as interface 240, and optical disk drive 233 are typically connected to the system bus 221 by a removable memory interface, such as interface 250.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through input devices such as a keyboard 262, a microphone 263, and a pointing device 261, such as a mouse, trackball or touch pad. Other input devices (not shown) may include a joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A visual display 291 or other type of display device is also connected to the system bus 221 via an interface, such as a video interface 290. Video interface 290 can comprise a graphics card having a GPU. The GPU be used for computations including those performed by 106 and 111. In addition to the monitor, computers may also include other peripheral output devices such as speakers 297 and printer 296, which may be connected through an output peripheral interface 295.

The computer 210 is operated in a networked environment using logical connections to one or more remote computers, such as a remote computer 280. The remote computer 280 may be a personal computer, a hand-held device, a server, a router, a network PC, a peer device or other common network node, and typically includes many or all of the elements described above relative to the computer 210. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on remote computer 280. It will be appreciated that the network connections shown are exemplary and other means of establishing a communications link between the computers may be used.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, weights, percentages, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximations unless the word "about" is recited.

To facilitate review of the various embodiments of the disclosure, the following explanations of specific terms are provided:

Definitions and Abbreviations

Non-transitory as used herein when referring to a computer-accessible medium, is a limitation of the medium itself (i.e., tangible, not a propagating electromagnetic signal) as opposed to a limitation on data storage persistency. The term is not intended to otherwise limit the type of physical computer-readable storage device that is encompassed by the phrase computer-accessible medium or memory. For instance, the terms "non-transitory computer readable medium" or "tangible memory" are intended to encompass types of storage devices that do not necessarily store information permanently, including but not limited to, computer-readable media that store data only for short periods of time and/or only in the presence of power, such as register memory, processor cache and Random Access Memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

User representation as used herein refers to a representation of a social media user and can refer particularly to the author of a posting and his/her connection (via direct or indirect communications) to other users via his/her social network. For example, the representation can represent friends of the author, followers of the author, people followed by the author, people who tag or mention the author, people tagged by the author, people who like the author, people liked by the author, etc.).

Prediction as used herein when referring to characterizing social media posts as trusted news or as types of suspicious news is inclusive of classification and regression tasks. For example, prediction can refer to the task of classification of social media posts as trusted news or as types of suspicious news. Prediction can also refer to the task of regression performed on social media postings to determine a score associated with each social media posting as being clickbait-like (e.g., untrustworthy).

EXAMPLES AND COMPARISONS

To further illustrate certain embodiments of the disclosed systems, methods, neural network architectures, and non-transitory computer-readable media, and to provide various comparative analyses and data, below are some examples with comparison test data.

Classification Results Using Neural Network Architecture

False news stories distributed in social media vary depending on the intent behind falsification. Unlike verified news, suspicious news tends to build narratives rather than report facts. On one extreme is disinformation, which communicates false facts to deliberately deceive readers or promote a biased agenda. Misinformation includes posts generated and retweeted from propaganda and clickbait ("eye-catching" headlines) accounts. The intent behind propaganda and clickbait varies from opinion manipulation and attention redirection to monetization and traffic attraction. Hoaxes are another type of misinformation that aims to deliberately deceive the reader. On the other extreme is satire, e.g., @TheOnion, where the writer's primary purpose is not to mislead the reader, but rather entertain or criticize. However, satirical news and hoaxes may also be harmful, especially when they are shared out of context.

In the following examples, types of deceptive news can be described as follows.

Disinformation is false information spread to deceive
Conspiracy a belief that some covert but influential organization is responsible for a circumstance or event
Propaganda deliberately spread misinformation
Hoax seek to mislead for financial or political gain
Clickbait take bits of true stories but make up details
Satire take fun of the news: satirical bent or parodies The analysis and experiments described in this example rely on a large Twitter corpus collected during a two-week period around terrorist attacks in Brussels in 2016. The method of collection ensures that the neural networks learn from verified and suspicious news within a predefined timeframe, and further ensures homogeneity of deceptive texts in length and writing manner.

TABLE 1

| TYPE | NEWS | POSTS | RTPA | EXAMPLES |
| --- | --- | --- | --- | --- |
| Propaganda | 99 | 56,721 | 572 | ActivistPost |
| Satire | 9 | 3,156 | 351 | ClickHole |
| Hoax | 8 | 4,549 | 569 | TheDcGazette |
| Clickbait | 18 | 1,366 | 76 | chroniclesu |
| Verified | 166 | 65,792 | 396 | USATODAY |

Twitter dataset statistics: news accounts, posts and retweets per account (RTPA).

Data: Suspicious News

Several public resources annotate suspicious Twitter accounts or their corresponding websites as propaganda, hoax, clickbait and satire. They include propaganda accounts identified using crowdcoursing and following public suspicious news classification schemas online, satire, clickbait and hoax accounts. In total, we identified 174 suspicious news accounts.

Data: Verified News

A list of 252 "trusted" news accounts that tweet in English were manually constructed and checked to ensure they are verified on Twitter.

Tweet Corpus

The Twitter firehose was queried from Mar. 15 to Mar. 29, 2016—one week before and after the Brussels bombing on Mar. 22, 2016 for 174 suspicious and 252 verified news accounts. We collected retweets generated by any user that mentions one of these accounts and assigned the corresponding label propagated from suspicious or trusted news. We de-duplicated, lowercased, and tokenized these posts and applied standard NLP preprocessing. We extracted part-of-speech tags and dependency parses for 130 thousand tweets using SyntaxNet, an open-source neural network framework implemented in TensorFlow that provides a foundation for Natural Language Understanding (NLU) systems developed by Chris Alberti, David Weiss, Daniel Andor, Michael Collins & Slav Petrov.

Neural Network Architectures

Figure 3:
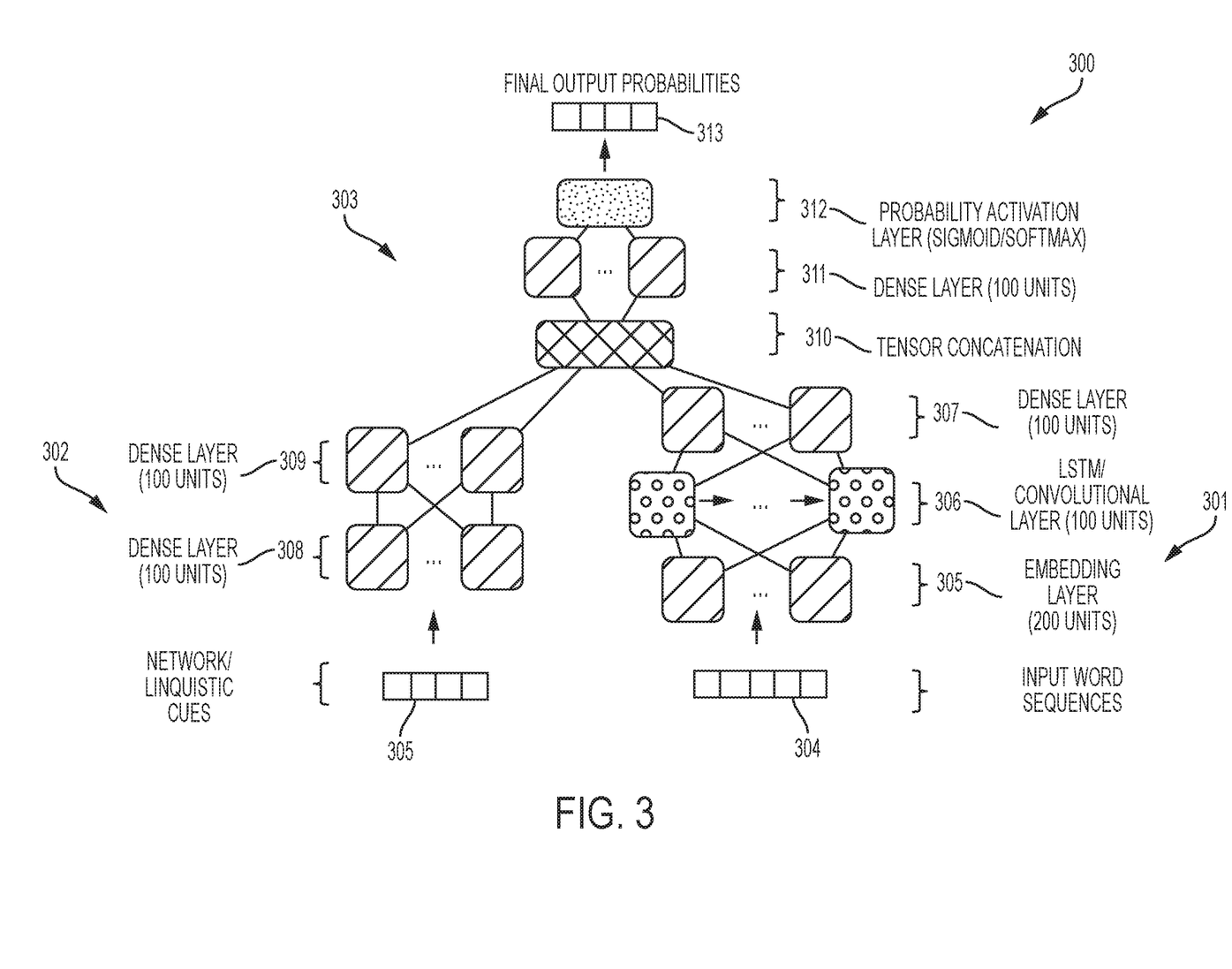
FIG. 3 is an illustration of one neural network architecture according to embodiments described herein.

A linguistically-infused neural network architecture can classify social media posts retweeted from news accounts into verified and suspicious categories—propaganda, hoax, satire and clickbait. The architectures incorporate tweet text (as text and/or word sequences 304), social graph (a network of users associated with a social media posting represented as a user representation 305), linguistic markers of bias and subjectivity (as vector representations 305), and moral foundation signals (as vector representations 305). One embodiment of a neural network architecture 300 is presented in FIG. 3. The word sequences are provided to a content sub-network 301 and the vector and user representations to another 302. A fusion subnetwork 303 merges the outputs of the content 301 and other vector representation 302 sub-networks. In one arrangement, the content subnetwork 302 consists of an embedding layer 305 and either (a) one LSTM layer or (b) two 1-dimensional convolution layers 306 followed by a max-pooling layer 307. Differences between the two arrangements are denoted in the Recurrent or Convolutional network results respectively in Table 2. We initialize our embedding layer with pre-trained embeddings of an unsupervised learning algorithm for obtaining vector representations for words. One example of such an algorithm includes GloVe by Pennington, Socher, and Manning (2014). The social graph sub-network is a simple feed-forward network that takes vectors of user interactions, e.g. @mentions, as input. In addition to content and network signals, we incorporate other linguistic cues into our networks as described below. A "late fusion" approach has been employed in which the fusion operator merges outputs from the content and vector representation networks. The neural network 300 was trained for 10 epochs and evaluated using ten-fold cross-validation.

Text Representations of Social Media Postings

The neural network architectures described herein were compared to several baselines. Word- and document-level embeddings have been shown to be effective as input to simpler classifiers. Experiments included several inputs for testing baseline classifiers: (a) TFIDF features, (b) Doc2Vec vectors and (c) Doc2Vec or TFIDF features concatenated with linguistic or network features. In the case of Doc2Vec features, we induce 200-dimensional vectors for each tweet using the Gensim library, training for 15 epochs. Genism, from developer RaRe Technologies, is an open-source vector space modeling and topic modeling toolkit implemented in Python.

Representations of Linguistic Markers of Social Media Postings

Bias Cues:

Hedges (i.e., expressions of tentativeness and possibility), assertive verbs (i.e., the level of certainty in the complement clause), factive verbs (i.e., those that presuppose the truth of their complement clause), implicative verbs (i.e., those that imply the truth or untruth of their complement), and report verbs were extracted from preprocessed tweets and represented using vector representations.

Subjectivity Cues:

External publicly available subjectivity, and positive and negative opinion lexical resources were utilized to extract strongly and weakly subjective words, as well as positive and negative opinion words.

Psycholinguistic Cues:

In addition to biased and subjective language cues, Linguistic Inquiry Word Count (LIWC) features were extracted to capture additional signals of persuasive and biased language in tweets. For example, persuasive language cues in LIWC include statistics and factual data, rhetorical questions, imperative commands, personal pronouns, and emotional language. Additional biased language cues captured by LIWC are quotations, markers of certainty, inclusions and conjunctions. Extra subjective language cues in LIWC cover positive and negative emotion and anxiety words.

Moral Foundation Cues:

There can be a small number of basic widely supported moral values, and people differ in the way they endorse these values. Moral foundations include care and harm, fairness and cheating, loyalty and betrayal, authority and subversion, and purity and degradation. Suspicious news can appeal to specific moral foundations of their readers in a way that is distinct from verified news accounts. Thus, they can help in predicting verified vs. suspicious news, as well as different suspicious news types.

TABLE 2

| Features | BINARY | | | MULTI-CLASS | |
|---|---|---|---|---|---|
| | A | ROC | AP | F1 | F1 macro |
| BASELINE 1: LOGISTIC REGRESSION (DOC2VEC) | | | | | |
| Tweets | 0.65 | 0.70 | 0.68 | 0.82 | 0.40 |
| +network | 0.72 | 0.80 | 0.82 | 0.88 | 0.57 |
| +cues | 0.69 | 0.74 | 0.73 | 0.83 | 0.46 |
| ALL | 0.75 | 0.84 | 0.84 | 0.88 | 0.59 |
| BASELINE 2: LOGISTIC REGRESSION (TFIDF) | | | | | |
| Tweets | 0.72 | 0.81 | 0.81 | 0.84 | 0.48 |
| +network | 0.78 | 0.87 | 0.88 | 0.88 | 0.59 |
| +cues | 0.75 | 0.85 | 0.85 | 0.86 | 0.49 |
| ALL | 0.79 | 0.88 | 0.89 | 0.89 | 0.59 |
| RECURRENT NEURAL NETWORK | | | | | |
| Tweets | 0.78 | 0.87 | 0.88 | 0.90 | 0.63 |
| +network | 0.83 | 0.91 | 0.92 | 0.92 | 0.71 |
| +cues | 0.93 | 0.98 | 0.99 | 0.90 | 0.63 |
| +syntax | 0.93 | 0.96 | 0.96 | 0.90 | 0.64 |
| ALL | 0.95 | 0.99 | 0.99 | 0.91 | 0.66 |
| CONVOLUTIONAL NEURAL NETWORK | | | | | |
| Tweets | 0.76 | 0.85 | 0.87 | 0.91 | 0.63 |
| +network | 0.81 | 0.9 | 0.91 | 0.92 | 0.70 |
| +cues | 0.93 | 0.98 | 0.98 | 0.90 | 0.61 |
| ALL | 0.95 | 0.98 | 0.99 | 0.91 | 0.64 |

Classification results: predicting suspicion and verified posts reported as A - accuracy, AP - average precision, ROC - the area under the receiver operator characteristics curve, and inferring types of suspicious news reported using F1 micro and F1 macro scores.

Table 2 presents classification results for Task 1 (binary)—suspicious vs. verified news posts and Task 2 (multi-class)—four types of suspicious tweets (e.g., propaganda, hoax, satire and clickbait). Performance is reported for different model and feature combinations.

The neural network architectures described herein (both CNNs and RNNs) significantly outperform logistic regression baselines learned from all types of representations. The accuracy improvement for the binary task is 0.2 and F1-macro boost for the multi-class task is 0.07. Furthermore, all architectures learned from network (e.g., user representations) and tweet text signals (e.g., word sequences) outperform those trained exclusively on tweet content (e.g., word sequences). We report 0.05 accuracy improvement for Task 1, and 0.02 F1 boost for Task 2. Further still, adding linguistic cues to basic tweet representations significantly improves results across all neural network architectures. Finally, by combining basic content with network and linguistic features via late fusion, our neural network architectures achieve best results in binary experiments. According to certain embodiments, architectures performed best in the multi-class case when trained on tweet embeddings and fused network features alone. We report 0.95 accuracy when inferring suspicious vs. verified news posts, and 0.7 F1-macro when classifying types of suspicious news.

Certain embodiments exclude syntax and grammar features as inputs to the neural network architectures because they tend to decreases performance; in one example, performance is decreased by 0.02 accuracy for the binary task and 0.02 F1 for multi-class. This may be explained by the domain differences between reviews and tweets which are shorter, noisier and difficult to parse.

TABLE 3

Linguistic analysis of moral foundations, bias and subjective language shown as the percentage of tweets with one or more cues across verified (V) and suspicious (F) news - propaganda (P), hoaxes (H), satire (S) and clickbait (C).

| CUES | V ↔ F | P ↔ S | P ↔ H | P ↔ C | S ↔ H | S ↔ C | H ↔ C |
|---|---|---|---|---|---|---|---|
| Harm | 2.1↓↓↓ 2.8 | 2.8↑ 2.1 | — | — | 2.0↓↓ 2.6 | — | — |
| Care | 5.8↓↓↓ 9.0 | 9.4↑↑↑ 6.3 | 9.4↑↑↑ 5.1 | 9.4↓ 11.3 | — | 6.3↓↓↓ 11.3 | 5.1↓↓↓ 11.3 |
| Fairness | — | 0.8↑ 0.4 | — | — | — | 0.4↓ 1.0 | — |
| Cheating | 0.3↑ 0.2 | — | — | — | — | — | — |
| Loyalty | 2.1↓↓↓ 2.5 | 2.2↓↓↓ 7.6 | — | — | 7.6↑↑↑ 2.0 | 7.6↑↑↑ 2.3 | — |
| Betrayal | 1.7↓↓ 3.1 | 3.4↑↑↑ 0.2 | 3.4↑↑↑ 2.2 | — | 0.2↓↓↓ 2.2 | 0.2↓↓↓ 3.0 | — |
| Authority | 2.4↓↓↓ 2.9 | 3.0↑ 2.1 | 3.0↑ 2.3 | — | — | — | — |
| Assertive | 12.6↓↓↓ 13.8 | — | — | — | — | — | — |
| Bias | 142.6↓↓↓ 164.4 | — | 165.5↑↑↑ 148.8 | — | 165↑↑↑ 148.8 | — | 148.8↓↓ 167.1 |
| Factive | 4.9↓↓↓ 5.5 | 5.5↓ 6.3 | 5.5↑ 4.7 | 5.5↓ 6.8 | 6.3↑ 4.7 | — | 4.7↓↓ 6.8 |
| Hedges | 14.2↓↓↓ 15.7 | 15.6↓↓↓ 20.0 | — | — | 20↑↑↑ 15.8 | 20↑↑↑ 13.4 | — |
| Implicative | 7.6↓↓↓ 8.9 | 8.6↓↓↓ 15.2 | — | — | 15.2↑↑↑ 8.8 | 15.2↑↑↑ 8.3 | — |
| Report | 30↓↓↓ 34.5 | 34.3↓ 36.0 | — | — | — | — | — |
| Subjective | 28.8↓↓↓ 32.8 | 32.6↓↓↓ 39.5 | — | — | 39.5↑↑↑ 30.9 | 39.5↑↑↑ 32.5 | — |
| Strong Subj | 23.5↓↓↓ 25.3 | 24.8↓↓↓ 31.5 | 24.8↓↓↓ 26.3 | 24.8↓↓↓ 27.5 | 31.5↑↑↑ 26.3 | — | — |
| Weak Subj | 24.8↓↓↓ 30.8 | 31.2↓↓↓ 32.8 | 31.2↑↑↑ 24.1 | — | 32.8↑↑↑ 24.1 | 32.8↑↑ 30.7 | 24.1↓↓↓ 30.7 |

We report only statistically significant differences: p-value ≤ 0.05↑, ≤ 0.01↑↑, ≤ 0.001↑↑↑ estimated using the Mann-Whitney U test. Subjective lexicon is from (Liu et al., 2005), weakly and strongly subjective terms are from (Riloff and Wiebe, 2003).

Linguistic Analysis and Discussion

Statistically significant differences were measured in linguistic markers of bias, subjectivity and moral foundations across different types of suspicious news, and were contrasted with verified news. These findings are presented in Table 3 and provide a deeper understanding of performance summarized in Table 2.

Verified news tweets contain significantly less bias markers, hedges and subjective terms and less harm/care, loyalty/betrayal and authority moral cues compared to suspicious news tweets. Satirical news are the most different from propaganda and hoaxes; and propaganda, hoax and clickbait news are the most similar.

Propaganda news target morals more than satire and hoaxes, but less than clickbait. Satirical news contains more loyalty and less betrayal morals compared to propaganda, hoaxes and clickbait news. Propaganda news target authority more than satire and hoaxes, and fairness more than satire.

Hoaxes and propaganda news contain significantly less bias markers (e.g., hedging, implicative and factive verbs) compared to satire. However, propaganda and clickbait news contain significantly more factive verbs and bias language markers compared to hoaxes. Satirical news use significantly more subjective terms compared to other news, while clickbait news use more subjective cues than propaganda and hoaxes.

Clickbait Score Prediction with Image Representation Inclusion into Neural Network Architectures Clickbait posts, which are often distinguished by eye-catching headlines, are designed to lure readers into clicking associated links by exploiting curiosity with vague, exaggerated, sensational and misleading content. The intent behind clickbait messages varies from attention redirection to monetization and traffic attraction. In the instant example, the neural network architectures described herein can be used to perform regression tasks capable of predicting the degree to which a social media posting is considered clickbait using a prediction value on a scale from 0 to 1.

Earlier work on detecting whether a message is clickbait or not presented a baseline approach using a set of 215 hand-crafted features and the state-of-the-art machine learning classifiers e.g., Logistic Regression, Naive Base and Random Forest. The best performing model achieved 0.79 ROC-AUC evaluated on 2,000 tweets.

Unlike the baseline approach, examples and embodiments described herein did not rely on hand-crafted features. Instead, learned representations from images and text were used to train a neural network. In addition, linguistic resources were used to automatically extract biased language markers to further enrich the neural network architectures with linguistic cues of uncertainty.

In one Clickbait Challenge (i.e., a contest), the task was to develop a regression model that provides a score characterizing the degree to which a social media posting is considered clickbait. In the datasets provided, the content of the post (text, media, and timestamp) and the primary content of the linked web page is included for each post. Scores for these posts were calculated as the mean judgment of at least five annotators who judge the post on a 4-point scale as not click baiting (0.0), slightly click baiting (0.3), considerably click baiting (0.66), or heavily click baiting (1.0). Submissions to the challenge were judged based on the mean squared error (MSE) of their score predictions, relative to the mean judgments of the crowd-sourced annotations. Thus, the task is a regression problem, optimizing MSE.

TABLE 4

| Dataset | # posts | # Clickbait: # Not |
|---|---|---|
| 2k Labelled | 2,495 | 1:2.23 |
| 20k Labelled | 19,538 | 1:3.10 |
| Unlabelled | 80,012 | ?:? |

Sizes and ratios of clickbait to non-clickbait posts of the datasets provided.

The clickbait challenge organizers provided three datasets for use to build and evaluate our neural network architectures: two labeled datasets and one unlabeled dataset. We will refer to the two labeled datasets by their approximate size, using "2 k labeled" to reference the smaller labeled dataset ('clickbait16-train-170331') and "20 k labeled" for the larger labeled dataset ('clickbait17-train-170630). As there is only one unlabeled dataset ('clickbait17-unlabeled-170429'), we simply refer to it as the unlabeled data. Table 4 summarizes the exact size of each of the datasets and the ratios of clickbait to nonclickbait posts in each. Clickbait posts are those with a score of 0.5 or greater and non-clickbait posts are those with a score below 0.5.

The linguistically-infused neural network models described in the instant example learn strength of clickbait content from the text present not only in the social media postings themselves but also the linked articles, as well as images present in the postings. It was hypothesized that while one should be able to get a certain level of performance using the text or images alone, including the linked article content or a joint representation of the posting and linked article would lead to a significant boost in performance.

Intuitively, even using a human to judge the strength of clickbaiting in a post, the content is a significant factor in determining how clickbait-y it is. Posts such as "This Tumblr account will nail your personality down in a second", "The most diverse place in America? It's not where you think", or "Once you consume them, they can move throughout your body—most commonly your brain" are clearly clickbaits. However, other posts can be harder to determine from the social media posting alone but considerably easier when you include the linked article and use the inconsistency between what the title hints at and what the article is actually about. For example, "Preserved dinosaur cells. Could scientists recreate a prehistoric beast?" which links to the article "Found: Preserved dinosaur cells but sadly scientists still can't build 'Jurassic World'".

Figure 4A:
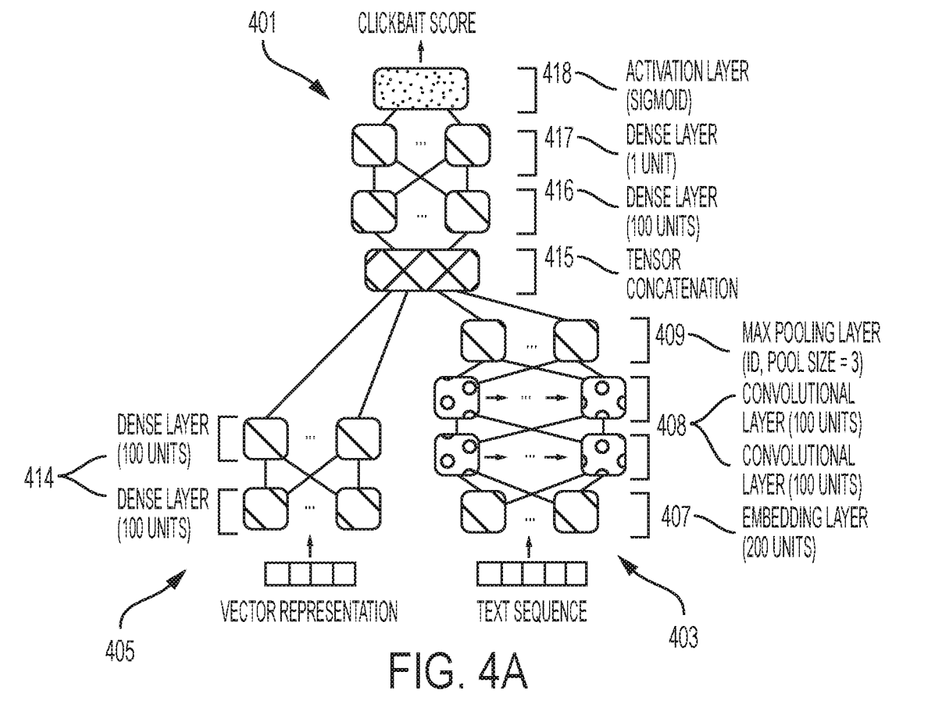
FIGS. 4A and 4B are illustrations of (4A) a neural network architecture having a convolutional neural network layer (CNN) and (4B) a long-short-term memory (LSTM) network layer as a type of recurrent neural network (RNN) in a content sub-network according to embodiments described herein.
Figure 4B:
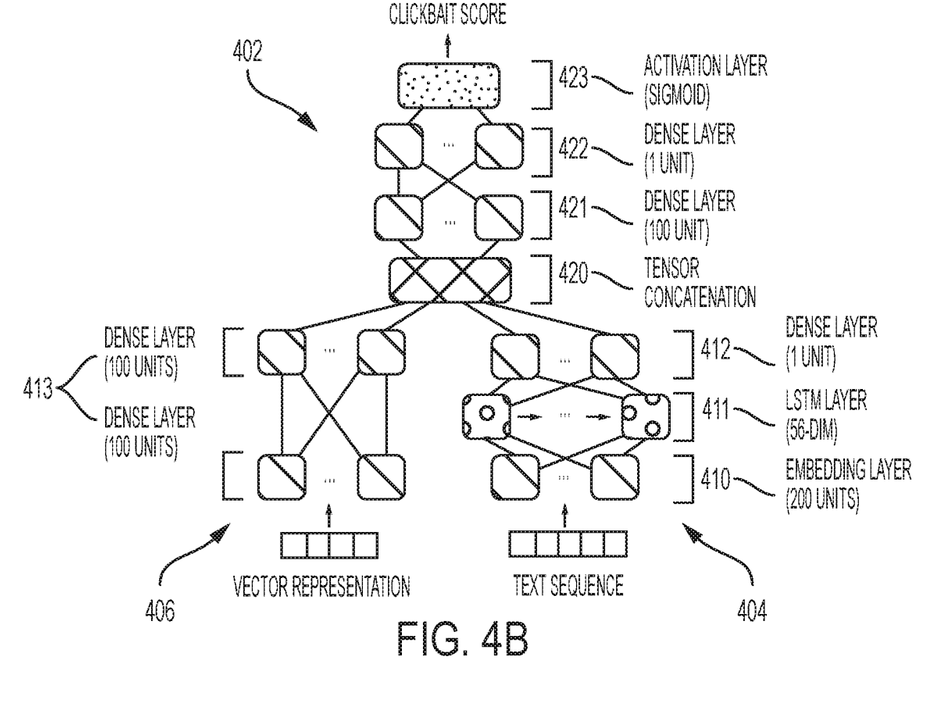

In the previous example, a linguistically-infused neural network model was used to effectively classify social media postings as containing trusted news or a type of suspicious news, wherein suspicious news was divided into one of multiple classes of deceptive content, clickbait being one such class. In the instant example, a neural network architecture is described for the regression task and unexplored inputs including images. Two neural network architectures 401 and 402 are shown in FIG. 4. Long Short-Term Memory (LSTM) 411 and/or Convolutional Neural Network (CNN) 408 layers were used in a content sub-network 403 and 404 portion of the neural networks. The content sub-network 403 and 404 comprised an embedding layer 407 and 410 and either two one-dimensional convolution layers 408 followed by a max-pooling layer 409 or a 56-dimensional LSTM layer 411 followed by a dense layer 412. Additional vector representations of the posts and associated content can be incorporated through the vector representation sub-network 405 and 406. In this sub-network 405 and 406, signals from images in the post and/or linguistic cues of the associated text, i.e. the linguistic markers of any bias present in the posting is processed according to two dense layers 413 and 414.

The embedding layer 407 or 410 is initialized with pre-trained GloVe embeddings, using the 200-dimensional embeddings trained on Twitter. In order to incorporate linguistic cues and/or image vector representations into our networks in addition to text representations, a "late fusion" approach was used. "Fusion" allows for the network to learn a combined representation of multiple input streams and can be done early (e.g., in the representation vector extraction layers) or later (e.g., in classification or regression layers). Using fusion as a technique for training networks to learn how to combine data representations from different modalities (e.g., text sequences and vector representations) to boost performance at a later stage in our model, we concatenate 415 and 420 the output from the content and linguistic or image (i.e., vector representation) sub-networks. The fusion operator can further comprise one or more dense layers 416, 417, 421, and 422. The fusion operator can further still comprise an activation layer 418 and 423. We hold out the 2 k labeled dataset and train each neural network model architecture and input combination on the larger, 20 k labeled dataset for a range of epochs (from 3 to 25) using the ADAM optimizer. We use AdaBoost (AB) regressor with unigrams and tf-idf vectors for each input combinations as baselines to compare against.

For each post in the dataset, the text content of the post itself and the associated article, the title, keywords, description, any figure captions, and the actual paragraphs of the article itself, are provided. We compare the performance of models that use the text of the post only, of the associated article only, and of both the post and article combined into a single document, where the text of the article is defined as the title, keywords, description, and paragraphs.

In the instant examples for the neural network architectures of FIGS. 4A and 4B, the raw text inputs are processed into padded text sequences using the following process. First, hashtags, mentions, punctuation, and urls were removed. Then, each input string was tokenized using the keras 2 text pre-processing tokenizer with a maximum of 10,000 words that was fit on the entire corpus (training and test data) so that the models would use a shared representation of the training and testing data in the embedding layer. These text sequences were truncated, or padded with zeros, to 100-dimensional vectors. These 100-dimensional vector representations of the text sequences are then passed into the content sub-network 404 or 403 (the LSTM or CNN architectures illustrated in FIGS. 4B and 4A, respectively).

The linguistic cues found in the content of the tweet and the title, keywords, description, and paragraphs of the associated article were used to boost performance of our neural networks. We extract assertive verbs (which indicate the level of certainty in the complement clause), factive verbs (which presuppose the truth of their complement clause), hedges (expressions of tentativeness and possibility), implicative verbs (which imply the veracity of their complement), and report verbs from pre-processed text. Similar linguistic cues have also been used to identify biased language on Wikipedia.

We relied on ResNet architecture initialized with ImageNet weights to extract 2,048-dimensional feature vectors from 10 k Twitter clickbait images in the labeled sets. We used the image vector representations as an input to vector representation sub-network 405 or 406 as shown in FIGS. 4A and 4B. The vector representation sub-networks in this example each comprise two dense layers 414 and 415. The dense layers each comprise 100 units.

Additionally, Google's Tensorflow Object Detection API 3 was used to extract objects from the clickbait images. Several models have been made available with varying speed and accuracy trade-offs. All models were pre-trained on the Common Objects in Context (COCO) dataset which contains 80 object classes. Due to the sparsity of COCO objects appearing in the images used for this example, we chose to implement the detection model with the highest performance even though it requires a longer run time. The model consists of a Faster R-CNN meta-architecture and utilizes Inception Resnet (v2) as a feature extractor. Object tags were not included in the final deployment of our model due to time and computation constraints. However, we performed the analysis of objects that appear on clickbait vs. non-clickbait Twitter post images as described elsewhere herein.

Experiments were performed using different combinations of input representation vectors to the neural network architectures in FIGS. 4A and 4B. The results of each combination of inputs and architectures were compared, training on the 20 k labeled dataset, using 20% of the data as validation data, and testing on the 2 k labeled dataset. Although the task was to minimize the mean squared error (MSE) of the clickbait scores predicted, we also consider the root mean squared error (RMSE) and the mean absolute error (MAE) of the embodiments' predicted scores when comparing model performance.

TABLE 5

Results different combinations of models and inputs when trained on the 20k labeled dataset and tested on the 2k labeled dataset provided.

| MODEL | TEXT INPUT | VECTOR INPUT | # EPOCHS | MSE | RMSE | MAE |
| --- | --- | --- | --- | --- | --- | --- |
| AB | Tweet | — | N/A | 0.0513 | 0.2266 | 0.1830 |
| AB | Tweet | LC (Tweet) | N/A | 0.0550 | 0.2346 | 0.1868 |
| AB | Tweet + Article | — | N/A | 0.0570 | 0.2387 | 0.1909 |
| AB | Tweet + Article | LC (Tweet + Article) | N/A | 0.0570 | 0.2387 | 0.1910 |
| CNN | Tweet | — | 3 | 0.0476 | 0.2183 | 0.1727 |
| CNN | Tweet | LC (Tweet + Article) | 3 | 0.0503 | 0.2242 | 0.1756 |
| CNN | Tweet | LC (Tweet + Article) + 2,048-dim image vectors | 3 | 0.0491 | 0.2216 | 0.1727 |
| CNN | Tweet | — | 5 | 0.0584 | 0.2416 | 0.1898 |
| CNN | Tweet | LC (Tweet + Article) | 5 | 0.0514 | 0.2266 | 0.1783 |
| CNN | Tweet | LC (Tweet + Article) + 2,048-dim image vectors | 5 | 0.0504 | 0.2245 | 0.1767 |
| CNN | Tweet | — | 10 | 0.0612 | 0.2474 | 0.1940 |
| CNN | Tweet | LC (Tweet + Article) | 10 | 0.0532 | 0.2307 | 0.1810 |
| CNN | Tweet | LC (Tweet + Article) + 2,048-dim image vectors | 10 | 0.0531 | 0.2305 | 0.1811 |
| CNN | Tweet | — | 25 | 0.0642 | 0.2535 | 0.1994 |
| CNN | Tweet | LC (Tweet + Article) | 25 | 0.0548 | 0.2340 | 0.1851 |

TABLE 5-continued

Results different combinations of models and inputs when trained on the
20k labeled dataset and tested on the 2k labeled dataset provided.

| MODEL | TEXT INPUT | VECTOR INPUT | # EPOCHS | MSE | RMSE | MAE |
|---|---|---|---|---|---|---|
| CNN | Tweet | LC (Tweet + Article) + 2,048-dim image vectors | 25 | 0.0543 | 0.2329 | 0.1837 |
| LSTM | Tweet | — | 3 | 0.0471 | 0.2170 | 0.1702 |
| LSTM | Tweet | LC (Tweet + Article) | 3 | 0.0449 | 0.2120 | 0.1670 |
| LSTM | Tweet | LC (Tweet + Article) + 2,048-dim image vectors | 3 | 0.0444 | 0.2107 | 0.1664 |
| LSTM | Tweet | — | 5 | 0.0532 | 0.2307 | 0.1810 |
| LSTM | Tweet | LC (Tweet + Article) | 5 | 0.0525 | 0.2290 | 0.1803 |
| LSTM | Tweet | LC (Tweet + Article) + 2,048-dim image vectors | 5 | 0.0515 | 0.2269 | 0.1789 |
| LSTM | Tweet | — | 10 | 0.0619 | 0.2488 | 0.1963 |
| LSTM | Tweet | LC (Tweet + Article) | 10 | 0.0568 | 0.2384 | 0.1879 |
| LSTM | Tweet | LC (Tweet + Article) + 2,048-dim image vectors | 10 | 0.0555 | 0.2355 | 0.1856 |
| LSTM | Tweet | — | 25 | 0.0648 | 0.2546 | 0.2001 |
| LSTM | Tweet | LC (Tweet + Article) | 25 | 0.0618 | 0.2486 | 0.1963 |
| LSTM | Tweet | LC (Tweet + Article) + 2,048-dim image vectors | 25 | 0.0609 | 0.2467 | 0.1946 |

Results are separated by architecture used (AdaBoost, CNN 401, or LSTM 402) and sorted by the number of epochs used in training. Lowest MSE for each model is highlighted in bold. Text only models (using only the content sub-networks 404 and 403 of the LSTM or CNN model architectures shown above) are indicated with a "—" in the Vector Input column.

After comparing the performance of predicting clickbait scores using different types of inputs, we found the highest performance when using the tweet as the text sequence input combined with the linguistic cues (LC) extracted from the tweet and the title, keywords, description, and paragraphs of the linked article. We report the results of these input combinations for the LSTM 402 and CNN 401 architectures in Table 5, along with the results of our baseline Adaboost (AB) models. For each neural network model, we report the results after training for 3, 5, 10, and 25 epochs. Results are ordered by model, inputs and the number of epochs.

The higher performing models were trained on fewer epochs (3 or 5) and the lower performing models were those using text only inputs and 25 epochs. Thus, we focused on models training on less than 25 epochs as well as some trained particularly on 3 and 5 epochs. The models that included the 2,048-dimensional image vectors performed slightly higher than equivalent models without, e.g. the best LSTM models with images (MSE=0.0444) and without images (MSE=0.0449). There is a much longer run time for models that need to extract the 2,048-dimensional image vector representations.

We also developed models trained with noisy labels as well as the clean labels provided in the 20 k and 2 k labeled dataset. The neural network architecture with the LSTM layer that used the text sequence input from the tweets and the linguistic cues vector representations (i.e., the model associated with an MSE=0.0449) of the tweet and article documents was utilized, and the provided 80 k unlabeled tweets were labeled. Then we combined the 20 k labeled dataset and the 80 k unlabeled dataset with our noisy labels our model predicted into a single dataset of approximately 100 k examples, which we refer to as the noisy label dataset. The ratio of this combined dataset is skewed slightly more to non-clickbait posts than the 20 k labeled dataset had, as shown in Table 6.

TABLE 6

| DATASET | # POSTS | # CLICKBAIT: # NOT |
|---|---|---|
| Unlabelled | 80,012 | 1:3.98 |
| Noisy Labelled | 99,551 | 1:3.78 |

Ratios of clickbait to non-clickbait labeled posts of the noisily labels for the unlabeled dataset and the noisy labeled dataset that incorporates both the 20k labeled dataset and the noisy labels for the unlabeled data.

Next, we compare different combinations of models trained on this noisy dataset. As before, we use a validation split of 80-20 during training, so each model is trained on approximately 80 thousand examples and validated on 20 thousand examples before being tested on the 2 k labeled dataset. We report the results of the LSTM 402 and CNN 401 models that use the top performing input combinations on this noisy labeled data in Table 7. These models performed similarly to our previous models trained on the 20 k labeled data.

TABLE 7

| MODEL | TEXT | VECTOR | # EPOCHS | MSE | RMSE | MAE |
|---|---|---|---|---|---|---|
| CNN | tweet | — | 3 | 0.0449 | 0.2119 | 0.1677 |
| CNN | tweet | LC (tweetiartide) | 3 | 0.0435 | 0.2086 | 01647 |
| CNN | tweet | — | 5 | 0.0460 | 0.2145 | 0.1696 |
| CNN | tweet | LC (tweet + artide) | 5 | 0.0439 | 0.2095 | 0.1657 |
| CNN | tweet | — | 10 | 0.0478 | 0.2186 | 0.1721 |
| CNN | tweet | LC (tweet + artide) | 10 | 0.0447 | 0.2114 | 0.1674 |
| CNN | tweet | — | 25 | 0.0476 | 0.2181 | 01726 |
| CNN | tweet | LC (tweet + artide) | 25 | 0.0442 | 0.2102 | 0.1666 |
| LSTM | tweet | — | 3 | 0.0450 | 0.2120 | 0.1665 |
| LSTM | tweet | LC (tweet + artide) | 3 | 0.0448 | 0.2116 | 0.1664 |
| LSTM | tweet | — | 5 | 0.0451 | 0.2123 | 0.1666 |
| LSTM | tweet | LC (tweet + artide) | 5 | 0.0458 | 0.2140 | 0.1679 |
| LSTM | tweet | — | 10 | 0.0459 | 0.2143 | 0.1685 |
| LSTM | tweet | LC (tweet + artide) | 10 | 0.0454 | 0.2130 | 0.1679 |
| LSTM | tweet | — | 25 | 0.0469 | 0.2166 | 0.1705 |
| LSTM | tweet | LC (tweet + artide) | 25 | 0.0470 | 0.2168 | 0.1705 |

Results of neural network models trained on the noisy labeled dataset and tested on the 2k labeled dataset. Results are separated by model architecture used (CNN 410 or LSTM 402) and sorted by the input combinations and the number of epochs used in training. Lowest MSE for each model is highlighted in bold. Text only models (using only the right sub-network of the LSTM or CNN model architectures shown above) are indicated with a - in the Vector Input column.

Figure 5:
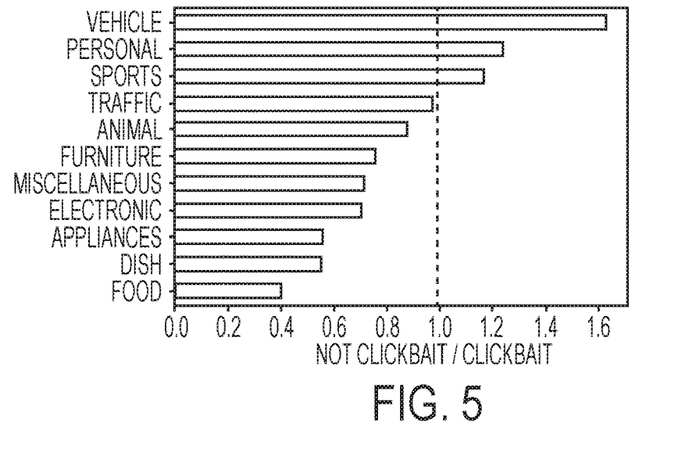
FIG. 5 is a chart showing the proportion of objects extracted from non-clickbait to clickbait images clustered into eleven COCO categories.
Figure 6A:
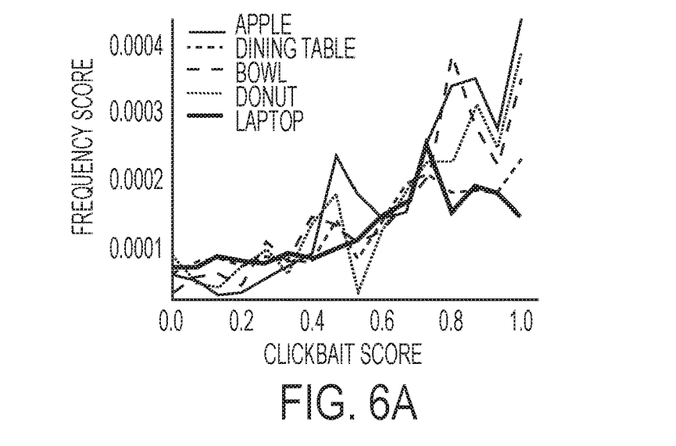
FIGS. 6A and 6B contains graphs of trends in object proportions as a function of the clickbait score.
Figure 6B:
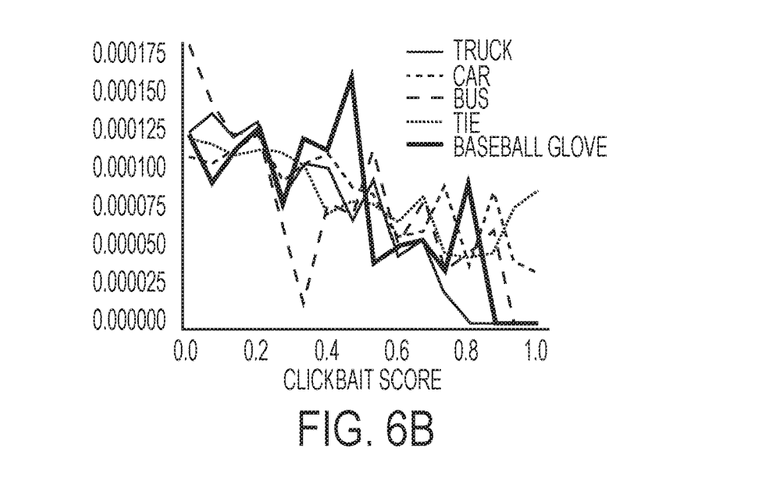

FIG. 5 reports preliminary results on objects extracted using Tensorflow Object Detection API from clickbait vs. non-clickbait images. We found that only 10,270 (47%) posts out of 22,033 tweets in labeled dataset contained images. We were able to extract objects from 9,488 out of 10,270 images (2,057 clickbaits and 7,431 non-clickbaits). We grouped objects extracted from images into eleven COCO categories. We found that there are more objects from vehicle, sports and personal categories in non-clickbait images than in clickbait images. There are no significant differences in objects from furniture, animal, and traffic categories. We observed that clickbait images have more objects from food, appliances, and dish categories compared to non-clickbait images. FIGS. 6A and 6B present trends for object proportions as a function of the clickbait score. We observe in FIG. 6A that the number of food objects (e.g., apple, donut), furniture objects (e.g., dining table), and electronics objects (e.g., laptop) increases as the clickbait score increases; and in FIG. 6B that the number of vehicle objects (e.g., car, bus, truck) decreases as the clickbait score increases.

In one embodiment, a neural network architecture that used the text of the tweet and the linguistic cues found in the tweet and associated article (e.g., the text of the tweet, article title, article keywords, article description, and article paragraphs) predicted a clickbait score for a given tweet. We trained this model on the 20 k labeled dataset and results were associated with a mean squared error of 0.04 and an $R^2$ of 0.44. The final test sample contained 18,979 instances with a 1:3.2 clickbait to not-clickbait ratio, similar to the ratio of 1:3.10 of the 20 k labeled dataset. This is a similar performance to that which we saw when testing on the 2 k labeled dataset where we also saw a MSE of 0.04, as noted in Table 5.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A computer-implemented method of predicting social media posts as trusted news or as types of suspicious news, the method comprising:

providing records from a social media site, each record comprising a social-media posting;

for each record, calculating a text representation based on the record, linguistic markers based on the record, and a user representation representing communications among connected users regarding the record;

inputting the text representations, linguistic markers, and user representations into a neural network having a content sub-network receiving the text representations and a vector representation sub-network receiving the linguistic markers and the user representations;

merging output from the content sub-network and output from the vector representation network according to a fusion operator, wherein the output from each sub-network has a different modality; and calculating according to the neural network a distribution over probability classes regarding the records.

2. The computer-implemented method of claim 1, wherein content sub-network comprises an embedding layer and at least one of a convolutional layer or a recurrent layer.

3. The computer-implemented method of claim 2, wherein the recurrent layer comprises a long-short term memory layer.

4. The computer-implemented method of claim 1, wherein the linguistic markers are selected from the group consisting of: psycholinguistic cues, style, syntax, biased language markers, subjective language markers and connotations, hedges, implicative, factive, assertive and report verbs, moral foundation theory markers, and combinations thereof.

5. The computer-implemented method of claim 1, wherein the records comprise one or more foreign languages.

6. The computer-implemented method of claim 1, further comprising the step of: labeling the probability classes with labels correlated to a set of pre-selected labels based on trusted news or types of suspicious news.

7. The computer-implemented method of claim 1, further comprising inputting an image, an image representation, or both into the neural network.

8. The computer-implemented method of claim 7, the neural network having the vector representation sub-network receiving the image, the image representation, or both.

* * * * *